(12) United States Patent
Zapolsky et al.

(10) Patent No.: US 10,754,349 B2
(45) Date of Patent: Aug. 25, 2020

(54) ROBOT SYSTEMS PROVIDING BUMP DETECTION AND ROBOTS INCORPORATING THE SAME

(71) Applicant: Toyota Research Institute, Inc., Los Altos, CA (US)

(72) Inventors: Samuel Zapolsky, San Francisco, CA (US); Catherine O'Donnell, Cambridge, MA (US); Jonathan Yao, San Jose, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 288 days.

(21) Appl. No.: 15/993,808

(22) Filed: May 31, 2018

(65) Prior Publication Data

US 2019/0369632 A1 Dec. 5, 2019

(51) Int. Cl.
| | |
|---|---|
| G05D 1/00 | (2006.01) |
| B25J 5/00 | (2006.01) |
| B25J 9/16 | (2006.01) |
| B25J 13/08 | (2006.01) |
| G05D 1/02 | (2020.01) |

(52) U.S. Cl.
CPC ............ G05D 1/0238 (2013.01); B25J 5/007 (2013.01); B25J 9/1666 (2013.01); B25J 13/085 (2013.01)

(58) Field of Classification Search
CPC ............... G05D 1/0238; G05D 1/0227; G05D 2201/02; B25J 5/007; B25J 9/1666; B25J 13/085

USPC .................................................. 700/245, 258
See application file for complete search history.

(56) References Cited

U.S. PATENT DOCUMENTS

| | | | |
|---|---|---|---|
| 6,443,509 B1* | 9/2002 | Levin .................. | A01D 34/008 293/4 |
| 9,937,628 B2* | 4/2018 | Werner ................. | B25J 13/086 |
| 2005/0021181 A1* | 1/2005 | Kim ..................... | G05D 1/0227 700/245 |
| 2005/0038563 A1 | 2/2005 | Rauf et al. | |
| 2008/0039974 A1* | 2/2008 | Sandin ................. | G05D 1/0261 700/258 |
| 2011/0140829 A1* | 6/2011 | Veenstra ............. | G05D 1/0227 340/1.1 |
| 2015/0271991 A1* | 10/2015 | Balutis ................ | G05D 1/0221 700/264 |
| 2017/0072570 A1* | 3/2017 | Fay ....................... | B25J 9/1694 |
| 2019/0155277 A1* | 5/2019 | Ozmen ................. | G01L 5/0052 |

FOREIGN PATENT DOCUMENTS

| | | |
|---|---|---|
| CN | 202605719 U | 12/2012 |
| CN | 204536906 U | 8/2015 |
| CN | 206110040 U | 4/2017 |
| RU | 2010116011 A | 10/2011 |

* cited by examiner

*Primary Examiner* — Jaime Figueroa
(74) *Attorney, Agent, or Firm* — Dinsmore & Shohl LLP (57) ABSTRACT

A robot is provided. The robot includes a main body, one or more wheels coupled to the main body, one or more elastic members coupled to the main body, a disc coupled to the one or more elastic members, and one or more sensors. The disc is configured to move relative to the main body in response to a force exerted against the disc. The one or more sensors may detect a dislocation of the disc relative to the main body in response to the force exerted against the disc.

20 Claims, 6 Drawing Sheets

ROBOT SYSTEMS PROVIDING BUMP DETECTION AND ROBOTS INCORPORATING THE SAME

TECHNICAL FIELD

The present specification generally relates to robots and, more specifically, to robots and robots providing bump detection.

BACKGROUND

A robot that autonomously moves within an environment may bump into an external object. This may cause damage to the robot. Additionally, the robot may not be able to determine whether the robot made contact with an external object or not if the robot does not have sensors (e.g., pressure sensors) where the contact was made.

Accordingly, a need exists for a robot system that protects the robot from external objects and that is able to detect any contacts with an external object.

SUMMARY

In one embodiment, the robot includes a main body, one or more wheels coupled to the main body, one or more elastic members coupled to the main body, a disc coupled to the one or more elastic members, and one or more sensors. The disc is configured to move relative to the main body in response to a force exerted against the disc. The one or more sensors may detect a dislocation of the disc relative to the main body in response to the force exerted against the disc.

In another embodiment, a robot system includes a main body, one or more electric motors, one or more elastic members coupled to the main body, a disc coupled to the one or more elastic members and configured to move relative to the main body in response to a force exerted against the disc, one or more sensors for detecting a dislocation of the disc relative to the main body in response to an external force exerted against the disc, and a controller. The controller includes one or more processors, one or more memory modules, and machine readable instructions stored in the one or more memory modules that, when executed by the one or more processors, cause the controller to: collect a signal indicating the dislocation from the one or more sensors; and control an operation of the one or more electric motors based on the signal indicating the dislocation.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments described herein are directed to robots and robot systems having bump detection. When a robot bumps into an external object or is blocked by an obstacle, the robot may be damaged and the power train such as an electric motor may be overloaded. The robot needs to recognize the bumping and move away from the external object or the obstacle. In order to recognize the bumping, the robot should have sensors distributed over the exterior of the robot. Robots according to the present disclosure address the problems of conventional robots by employing a spring loaded disc that not only protects robots from external objects but also detects bumps with external objects.

The robot includes a main body, one or more wheels coupled to the main body, one or more elastic members connected to the main body, a disc connected to the one or more elastic members, and one or more sensors. The disc is configured to move relative to the main body in response to a force exerted against the disc. The one or more sensors may detect the dislocation of the disc relative to the main body in response to the force exerted against the disc. The present robot includes a spring-loaded disc that surrounds the robot. The spring-loaded disc protects the robot from bumping into objects proximate to the robot. Particularly, when the robot bumps into an object, the spring-loaded disc deflects relative to the main body of the robot and dampens the contact between the robot and the object. Additionally, the sensors of the robot may provide information about the contact between the disc and the object without need to install sensors on the entire surface of the robot with which an external object may contact.

Figure 1:
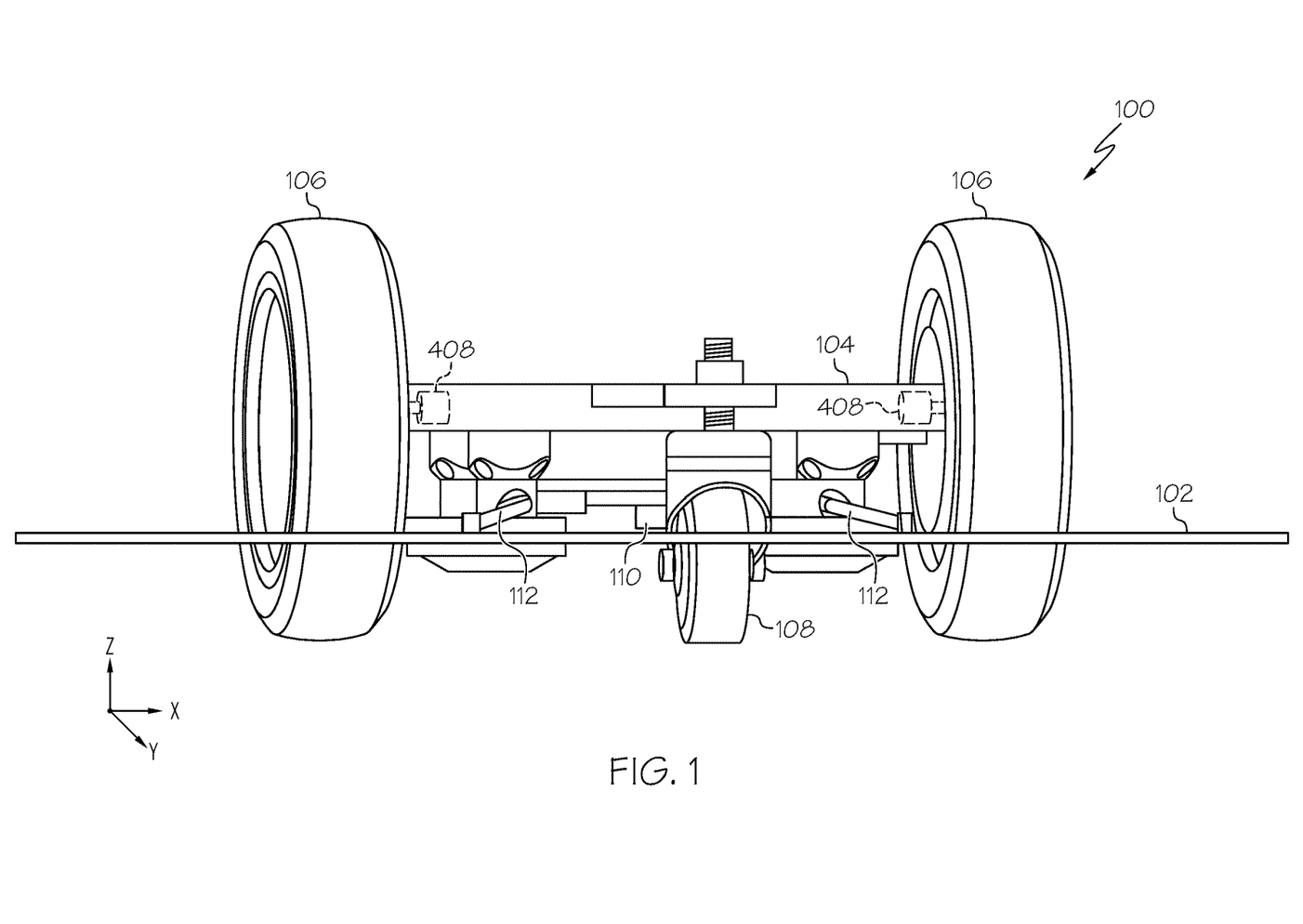
FIG. 1 depicts a robot according to one or more embodiments shown and described herein.

Referring now to FIG. 1, one non-limiting example of a robot 100 is illustrated. The robot 100 includes a disc 102, a main body 104, one or more main wheels 106, an assistant wheel 108, one or more sensors 110, and one or more elastic members 112. One or more electric motors 408 are disposed within the main body 104. The one or more electric motors 408 are coupled to the one or more main wheels 106. In some embodiments, the one or more elector motors 408 may be disposed outside the main body 104. Additional components may be disposed within the main body 104. For example, a controller 402, a satellite antenna 410, and a network interface hardware 412 shown in FIG. 4 may be disposed within the main body 140. The controller 402, the satellite antenna 410, and the network interface hardware 412 may be deposited on one or more boards, such as printed circuit boards.

The main body 104 may be connected to the main wheels 106 and the assistant wheel 108 such that the robot 100 maintains balance on a ground. The robot 100 may navigate x-y plane shown in FIG. 1 by operating the main wheels 106. While FIG. 1 depicts two main wheels 106, the robot 100 may include less than two or more than two main wheels. In some embodiments, the main body 104 may not include the assistant wheel 108. The robot 100 may include self-balancing function, for example, functions of detecting yaw, roll, and pitch and balancing based on the yaw, roll, and pitch data.

Figure 3:
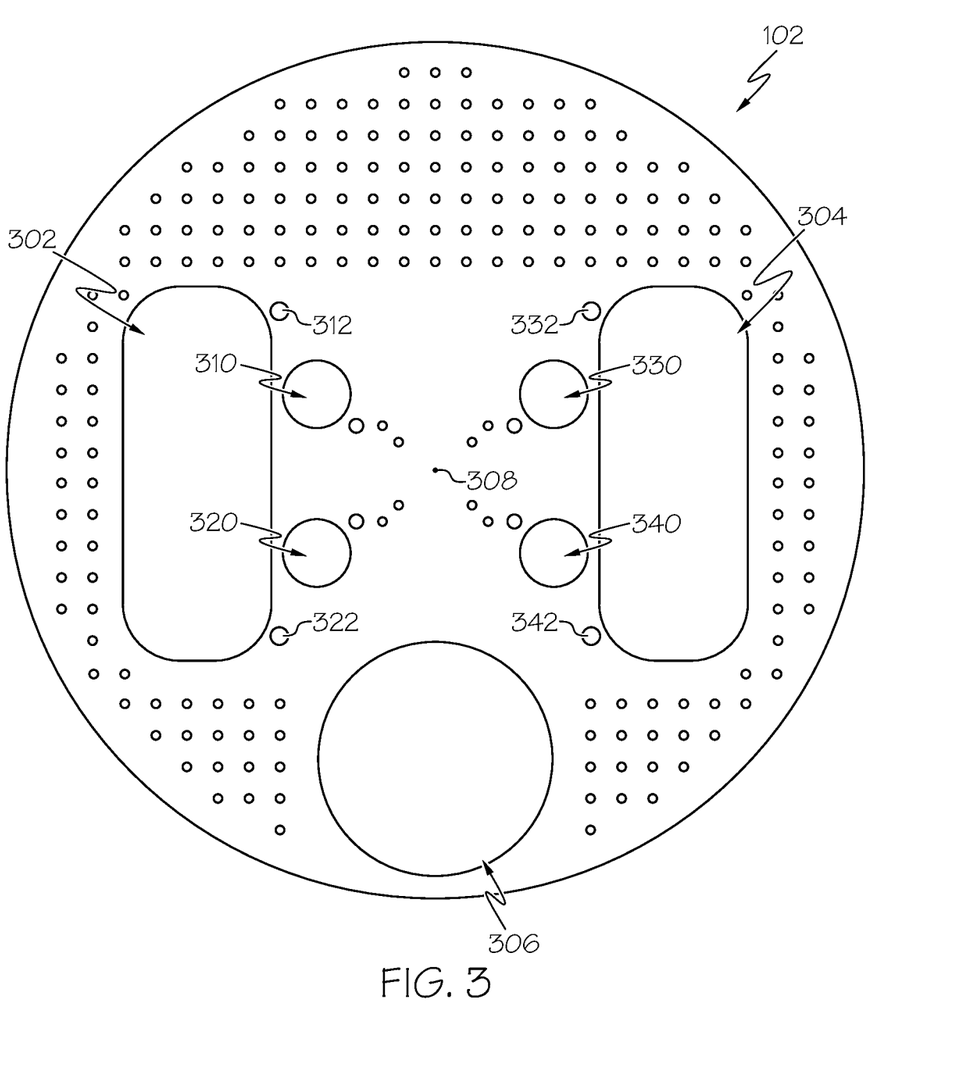
FIG. 3 depicts a disk of the robot of FIG. 1, according to one or more embodiments shown and described herein.

The disc 102 may be a plate as shown in FIG. 3. For example, the disc 102 is illustrated as a round plate in FIG. 3. In some embodiments, the disc 102 may be an elliptical plate. The disc 102 is larger in size than the main body 104 and the one or more main wheels 106 on a x-y plane such that the disc 102 surrounds the main body 104 and the one or more main wheels 106 as shown in FIG. 1. The disc 102 may protect the one or more main wheels 106 and the main body 140 from an external object when the robot 100 bumps into the external object.

Figure 2:
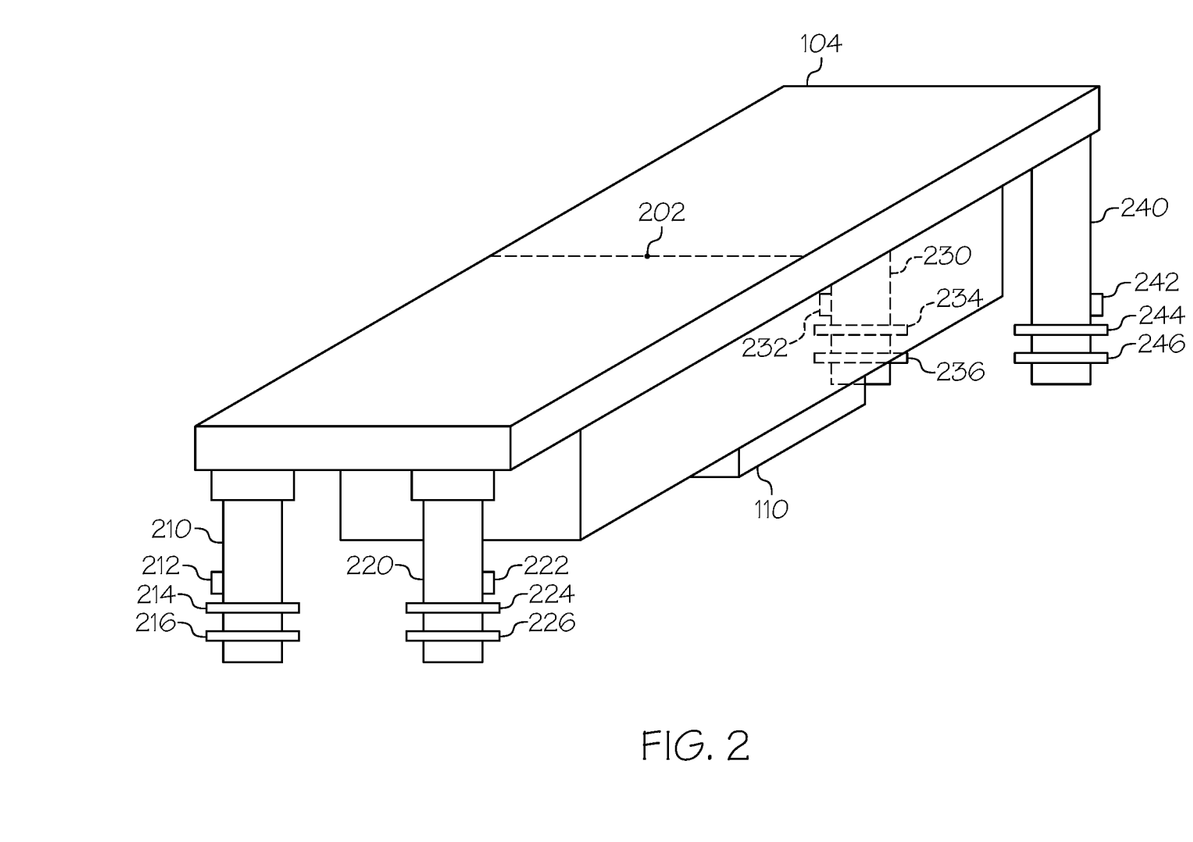
FIG. 2 depicts a main body of the robot in FIG. 1, according to one or more embodiments shown and described herein.

The disc 102 is connected to the main body 104 via the one or more elastic members 112, such that the disc 102 is not rigidly fixed to the main body 104 and may move relative to the main body 104. The center 202 of the main body 104 as shown in FIG. 2 may be aligned with the center 308 of the disc 102 as shown in FIG. 3 in a normal state. When the disc 102 bumps into an external object, the disc 102 may move relative to the main body 104 (i.e., the center 308 of the disc 102 may be dislocated from the center 202 of the main body 104 when viewed from the top of the robot 100). The one or more elastic members 112, which may be springs, for example, may contract or expand depending on the movement of the disc 102 relative to the main body 104. Detailed description of coupling mechanisms between the main body 104 and the disc 102 is described below with reference to FIGS. 2 and 3.

The one or more sensors 110 may be located between the main body 104 and the disc 102. The one or more sensors 110 detect the dislocation of the disc 102 relative to the main body 104. In some embodiments, the one or more sensors 110 may be two potentiometers. For example, two potentiometers may be placed between the main body 104 and the disc 102 and separated by an offset. As a non-limiting example, the offset may be 4 centimeters. Two potentiometers separated by an offset allow detecting two-dimensional dislocation of the disc 102 relative to the main body 104. The potentiometers may detect a force that exerted by an external object against the disc 102 when the disc 102 bumps into the external object. The potentiometers may determine x and y directional components of the force. In some embodiments, the one or more sensors 110 may be other types of sensors, for example, strain gauges. In another embodiment, the one or more sensors 110 may be one or more imaging sensors that capture images of the disc 102 to determine displacement.

Now referring to FIGS. 2 and 3, the coupling between the main body 104 and the disc 102 is described. FIG. 2 depicts the main body 104 according to one or more embodiments shown and described herein. The main body 104 may include a plurality of posts that may be connected to the disc 102. In embodiments, as shown in FIG. 2, the main body 104 includes four posts 210, 220, 230, and 240. The posts 210, 220, 230, and 240 may include spring holders 212, 222, 232, and 242, respectively. The spring holders 212, 222, 232, and 242 may be any mechanical component that is configured to hold one end of a spring. For example, the spring holders 212, 222, 232, and 242 may be hooks or rings to which a spring can be coupled. The hooks or rings protrude from each of the posts 210, 220, 230, and 240 such that springs may be coupled to the hooks or rings. As another example, the spring holders 212, 222, 232, and 242 may be bars to which springs can be hooked on.

The posts 210, 220, 230, and 240 may include an upper stopper and a lower stopper, respectively. For example, the post 210 may include an upper stopper 214 and the lower stopper 216. The post 220 may include an upper stopper 224 and the lower stopper 226. The post 230 may include an upper stopper 234 and the lower stopper 236. The post 240 may include an upper stopper 244 and the lower stopper 246. The upper stopper and the lower stopper may be in the shape of a circle whose diameter is greater that the diameter of the post.

The one or more sensors 110 may be located at the bottom of the main body 104. In embodiments, the one or more sensors 110 may be attached between the main body 104 and the disc 102 such that the one or more sensors 110 detect the dislocation of the disc 102 relative to the main body 104.

FIG. 3 depicts a top view of the disc 102 according to one or more embodiments shown and described herein. The disc 102 may also include openings 302 and 304 for receiving the main wheels 106. The disc 102 may include a hole 306 for receiving the assistant wheel 108. In embodiments that do not include the assistant wheel, the disc 102 may not include the hole 306 for receiving the assistant wheel 108. The disc 102 may include holes 310, 320, 330, and 340 for receiving the posts 210, 220, 230, and 240 shown in FIG. 2, respectively, such that the upper stoppers 214, 224, 234, and 244 are placed over the disc 102 and the lower stoppers 216, 226, 236, and 246 are placed under the disc 102. In FIG. 3, the openings 302 and 304 are illustrated as rectangular with rounded corners, but are not limited to the shape shown in FIG. 3. For example, the openings 302 and 304 may be a round opening, an elliptical opening, a rectangular opening with no rounded corners, etc. Similarly, the hole 306 may be in various shape, for example, a round hole, an elliptical hole, a rectangular hole with rounded corners, etc.

The disc 102 may include spring holders 312, 322, 332, and 342 for holding one ends of the springs 112. The spring holders 312, 322, 332, and 342 may be any mechanical component that is configured to hold one end of a spring. For example, the spring holders 312, 322, 332, and 342 may be hooks or rings to which a spring can be coupled. The hooks or rings protrude from the top surface of the disc 102 such that springs may be coupled to the hooks or rings. As another example, the spring holders 312, 322, 332, and 342 may be bars to which springs can be hooked on.

Thus, the spring 112 may be connected between the spring holder of the disc 102 and the spring holder of the main body 104. For example, the robot 100 may include four springs 112. The first spring 112 may be connected between the spring holder 212 in FIG. 2 and the spring holder 312 in FIG. 3. The second spring 112 may be connected between the spring holder 222 in FIG. 2 and the spring holder 322 in FIG. 3. The third spring 112 may be connected between the spring holder 232 in FIG. 2 and the spring holder 332 in FIG. 3. The fourth spring 112 may be connected between the spring holder 242 in FIG. 2 and the spring holder 342 in FIG. 3. The springs 112 may exert balanced resilient forces such that the disc 102 is fixed relative to the main body 104 on an x-y plane. In some embodiments, the number of springs 112 may be less than or more than four.

The diameter of each of the holes 310, 320, 330, and 340 is smaller than the diameter of each of the upper stoppers 214, 224, 234, and 244 and the lower stoppers 216, 226, 236, and 246, but greater than the diameter of each of the posts 210, 220, 230, and 240. The lower stoppers 216, 226, 236, and 246 are separable from the posts 210, 220, 230, and 240, respectively. For example, the lower stoppers 216, 226, 236, and 246 may be screwed out from the posts 210, 220, 230, and 240. After the lower stoppers 216, 226, 236, and 246 are separated from the posts 210, 220, 230, and 240, the posts 210, 220, 230, and 240 may be inserted into the holes 310, 320, 330, and 340, respectively. Then, the lower stoppers 216, 226, 236, and 246 may be coupled to the posts 210, 220, 230, and 240, e.g., by screwing them to the posts 210, 220, 230, and 240. When the main body 104 is connected to the disc 102, the upper stoppers 214, 224, 234, and 244 are placed over the top surface of the disc 102 and the lower stoppers 216, 226, 236, and 246 are placed under the bottom surface of the disc 102 such that the main body 104 is not separated from the disc 102 in +/−z direction in FIG. 1. Because the diameter of each of the holes 310, 320, 330, and 340 is greater than the diameter of each of the posts 210, 220, 230, and 240, the disc 102 may move relative to the main body in +/−x or y direction in FIG. 1 when an external force is applied against the disc 102.

Figure 4:
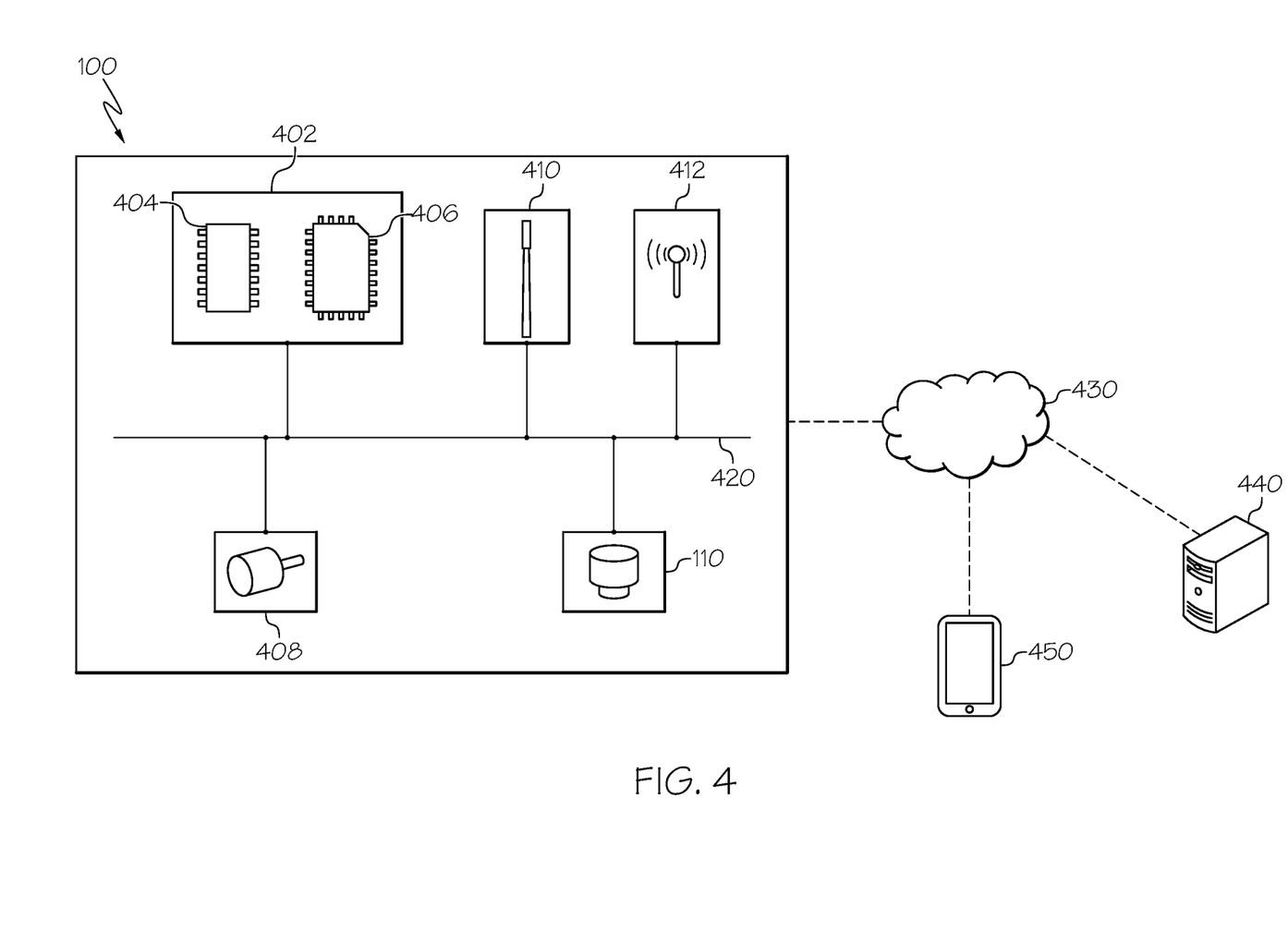
FIG. 4 schematically depicts a robot communicating with external devices, according to one or more embodiments shown and described herein.

FIG. 4 schematically depicts an example robot 100, according to one or more embodiments shown and described herein. The example robot 100 includes a controller 402 that includes one or more processors 404 and one or more memory modules 406. Each of the one or more processors 404 may be any device capable of executing machine readable and executable instructions stored on the one or more memory modules. Accordingly, each of the one or more processors 404 may be a controller, an integrated circuit, a microchip, a computer, or any other computing device. The one or more processors 404 are coupled to a communication path 420 that provides signal interconnectivity between various modules of the robot 100. Accordingly, the communication path 420 may communicatively couple any number of processors 404 with one another, and allow the modules coupled to the communication path 420 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 420 may be formed from any medium that is capable of transmitting a signal such as, for example, conductive wires, conductive traces, optical waveguides, or the like. In some embodiments, the communication path 420 may facilitate the transmission of wireless signals, such as Wi-Fi, Bluetooth, Near Field Communication (NFC) and the like. Moreover, the communication path 420 may be formed from a combination of mediums capable of transmitting signals. In one embodiment, the communication path 420 comprises a combination of conductive traces, conductive wires, connectors, and buses that cooperate to permit the transmission of electrical data signals to components such as processors, memories, sensors, input devices, output devices, and communication devices. Accordingly, the communication path 420 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 406 are coupled to the communication path 420. The one or more memory modules 406 may comprise RAM, ROM, flash memories, hard drives, or any device capable of storing machine readable and executable instructions such that the machine readable and executable instructions can be accessed by the one or more processors 404. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 406. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring to FIG. 4, the robot 100 includes one or more electric motors 408 that are coupled to the communication path 420. The one or more electric motors 408 are mechanically coupled to the one or more main wheels 106 (See FIG. 1) and provide torque to the one or more main wheels 106. The one or more electric motors 408 are coupled to the communication path 420 and receive instructions from the controller 402. For example, the controller 402 may control the rotation speed and rotation direction of the one or more electric motors 408.

Referring still to FIG. 4, the robot 100 includes one or more sensors 110. The one or more sensors 110 are coupled to the communication path 420. The one or more sensors 110 may detect a force applied against the disc 102 by an external object when the disc 102 bumps into the external object. The one or more sensors 110 may also detect the dislocation of the disc 102 relative to the main body 104. In embodiments, the one or more sensors 110 may be potentiometers. For example, two potentiometers may be placed between the main body 104 and the disc 102 and separated by an offset (e.g., 4 centimeters). The potentiometers may detect a force that exerted by an external object against the disc 102 when the disc 102 bumps into the external object. The potentiometers may determine x and y directional components of the force. In some embodiments, the one or more sensors 110 may be other types of sensors, for example, strain gauges. In another embodiment, the one or more sensors 110 may be imaging sensors capturing images of the disc 102. The one or more sensors 110 may communicate the detected force and/or the dislocation data to the controller 402. The controller 402 may control the one or more electric motors 408 based on the detected force and/or the dislocation data received from the one or more sensors 110. For example, the controller 402 may stop the operation of the one or more electric motors 408 in response to receiving the detected force and/or the dislocation data. As another example, the controller 402 may change the speed and/or rotation direction of the one or more electric motors 408 in response to receiving the detected force and/or the dislocation data.

Referring still to FIG. 4, the example robot 100 includes a satellite antenna 410 coupled to the communication path 420 such that the communication path 420 communicatively couples the satellite antenna 410 to other modules of the robot 100. The satellite antenna 410 is configured to receive signals from global positioning system satellites. Specifically, in one embodiment, the satellite antenna 410 includes one or more conductive elements that interact with electromagnetic signals transmitted by global positioning system satellites. The received signal is transformed into a data signal indicative of the location (e.g., latitude and longitude) of the satellite antenna 410 or an object positioned near the satellite antenna 410, by the one or more processors 404. The data signal may be used to determine the location of the robot 100 where the robot 100 bumped into an external object. In some embodiments, the robot 100 does not include the satellite antenna 410.

Referring still to FIG. 4, the robot 100 includes the network interface hardware 412 for communicatively coupling the robot 100 with a mobile device 450, a remote server 440, or other external device. The network interface hardware 412 is coupled to the communication path 420 such that the communication path 420 communicatively couples the network interface hardware 412 to other modules of the robot 100. The network interface hardware 412 may be any device capable of transmitting and/or receiving data via a wireless network. Accordingly, the network interface hardware 412 may include a communication transceiver for sending and/or receiving data according to any wireless communication standard. For example, the network interface hardware 412 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 412 includes a Bluetooth transceiver that enables the robot 100 to exchange information with the mobile device 450 (e.g., a smartphone) via Bluetooth communication.

Still referring to FIG. 4, the robot 100 may communicate detected force and/or dislocation data to the mobile device 450 via the network interface hardware 412. For example, the robot 100 may send a signal indicating that the robot 100 bumped into an external object to the mobile device 450 based on the detected force and/or dislocation data. The mobile device 450 may be any device having hardware (e.g., chipsets, processors, memory, etc.) for communicatively coupling with the network interface hardware 412 and the network 430. Specifically, the mobile device 450 may include an antenna for communicating over one or more of the wireless computer networks described above. Moreover, the mobile device 450 may include a mobile antenna for communicating with the network 430. Accordingly, the mobile antenna may be configured to send and receive data according to a mobile telecommunication standard of any generation (e.g., 1G, 2G, 3G, 4G, 5G, etc.). Specific examples of the mobile device 450 include, but are not limited to, smart phones, tablet devices, e-readers, laptop computers, or the like. In embodiments, the mobile device 450 may include software applications for controlling the robot 100. For example, a software application may send an instruction to the robot 100 that instructs the robot 100 to stop moving in response to the signal indicating that the robot 100 bumps into an external object. As another example, a software application may send an instruction to the robot 100 that instructs the robot 100 to change the moving direction of the robot 100.

The network 430 generally includes a plurality of base stations that are configured to receive or transmit data according to mobile telecommunication standards. The base stations are further configured to receive and transmit data over wired systems such as public switched telephone network (PSTN) and backhaul networks. The network 430 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Accordingly, the network 430 may be utilized as a wireless access point by the network interface hardware 412 or the mobile device 450 to access one or more servers (e.g., a remote server 440). The remote server 440 generally includes processors, memory, and chipset for delivering resources via the network 430. Resources may include providing, for example, processing, storage, software, and information from the remote server 440 to the robot 100 via the network 430. In some embodiments, the robot 100 may communicate force and/or dislocation data detected by the one or more sensors 110 to the remote server 440 via the network 430.

Figure 5A:
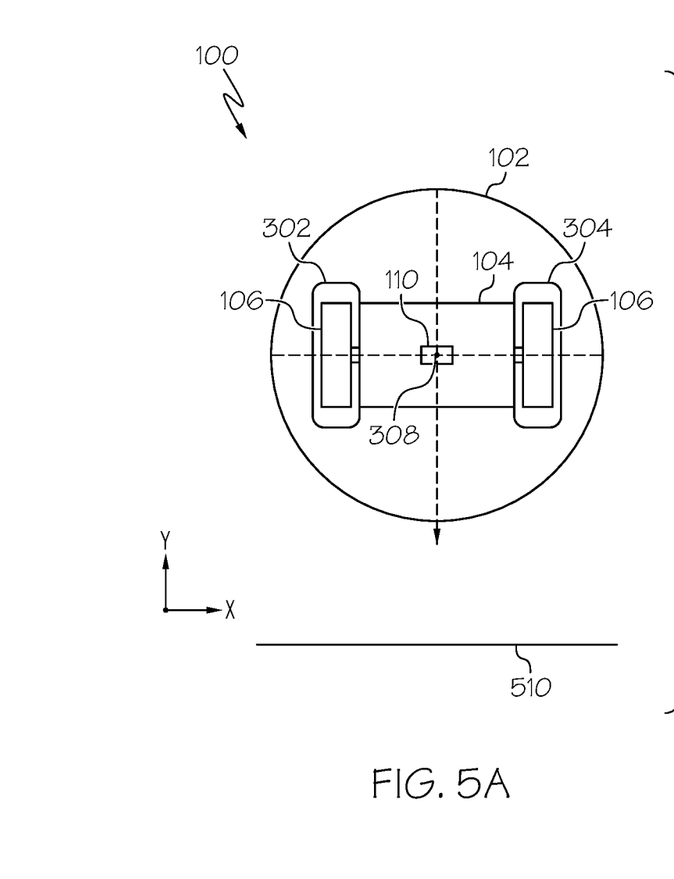
FIG. 5A depicts a robot bumping into an external object, according to one or more embodiments shown and described herein.
Figure 5B:
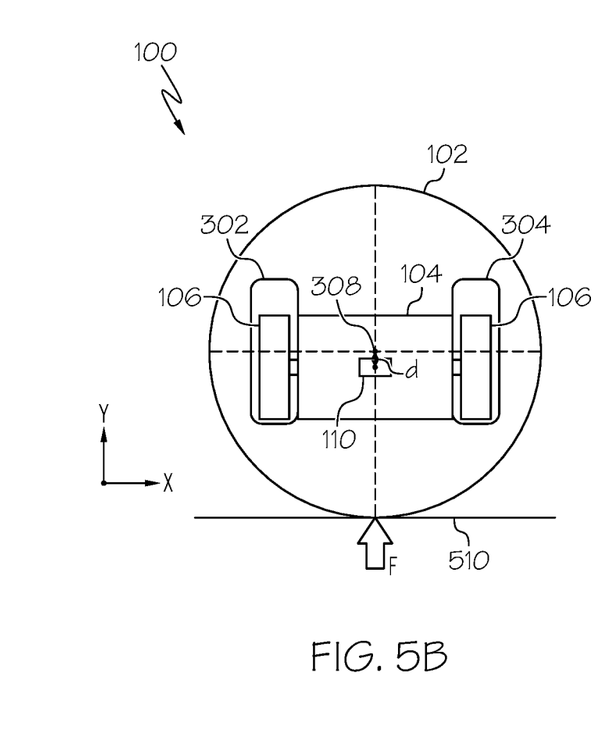
FIG. 5B depicts a robot bumping into an external object, according to one or more embodiments shown and described herein.

FIGS. 5A and 5B depict a top view of an example robot 100 bumping into an external object, according to one or more embodiments shown and described herein. In FIG. 5A, the robot 100 moves toward an object 510 (e.g., a wall). The center 308 of the disc 102 is aligned with the one or more sensors 110 while the robot 100 is moving toward the external object 510. In FIG. 5B, the robot 100 bumps into the external object 510, and the external object 510 applies a force F against the disc 102 in +y direction. The disc 102 may move relative to the main body 104 in response to the external force F such that the center 308 of the disc 102 is dislocated from the one or more sensors 110 of the main body 104 as shown in FIG. 5B. The one or more sensors may detect the dislocation of the disc 102 relative to the main body 104 and transmit a signal indicating the dislocation to the controller 402. In response to the signal, the controller 402 may control the operation of the one or more electric motors 408. In some embodiments, the controller 402 may stop the operation of the one or more electric motors 408 in response to receiving the signal indicating the dislocation. In another embodiment, the controller 402 may change the rotation direction of the one or more electric motors 408 in response to receiving the signal indicating the dislocation, such that the robot 100 may move away from the external object 510. For example, the controller 402 may change the rotation direction of both of the electric motors 408 mechanically coupled to the main wheels 106 shown in FIG. 5B such that the robot 100 moves away from the external object 510 (e.g., moving in +y direction). As another example, the controller 402 may change the rotation direction of one of the electric motors 408 mechanically coupled to the main wheel 106 such that two electric motors 408 may rotate in opposite direction and the robot 100 rotates clockwise or counter clockwise. Then, the controller 402 may control the electric motors 408 to rotate in the same direction such that the robot 100 may move away from the external object 510.

In embodiments, the one or more sensors 110 may detect an amount of force applied against the disc 102. For example, the one or more sensors 110 may be strain gauges connected between the main body 104 and the disc 102 and detect the force applied against the disc 102 by the external object. In some embodiments, the one or more sensors 110 may detect the direction of the force applied against the disc 102. For example, in FIG. 5B, the one or more sensors 110 may determine that the direction of the force applied against the disc 102 is +y direction.

Figure 6A:
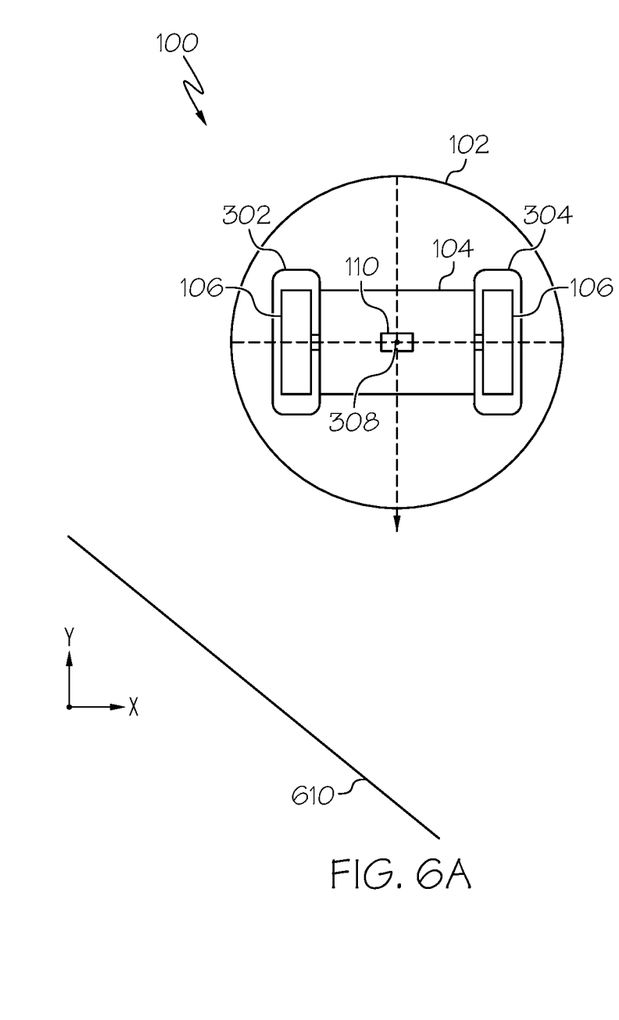
FIG. 6A depicts a robot bumping into an external object, according to one or more embodiments shown and described herein.
Figure 6B:
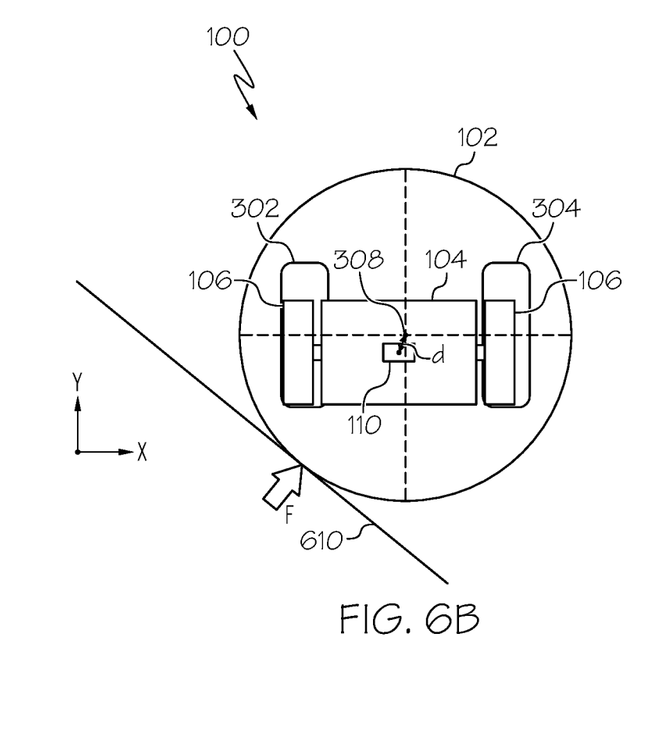
FIG. 6B depicts a robot bumping into an external object, according to one or more embodiments shown and described herein.

FIGS. 6A and 6B depict a top view of the robot 100 bumping into another external object, according to one or more embodiments shown and described herein. In FIG. 6A, the robot 100 moves toward an object 610 (e.g., a wall). The center 308 of the disc 102 is aligned with the one or more sensors 110 while the robot 100 is moving toward the external object 610. In FIG. 6B, the robot 100 bumps into the external object 610, and the external object 610 applies a force F against the disc 102 in a direction rotated by about 45 degrees from the +y direction. The disc 102 may move relative to the main body 104 in response to the external force F such that the center 308 of the disc 102 is dislocated from the one or more sensors 110 of the main body 104 as shown in FIG. 6B. In this example, the main body 104 moves toward a direction opposite to the direction of the external force F such that the center 308 of the disc 102 is dislocated from the one or more sensors 110 toward +x and +y directions as shown in FIG. 6B.

The one or more sensors 110 may detect the dislocation of the disc 102 relative to the main body 104 and transmit a signal indicating the dislocation to the controller 402. In response to the signal, the controller 402 may control the operation of the one or more electric motors 408. In some embodiments, the controller 402 may stop the operation of the one or more electric motors 408 in response to receiving the signal indication the dislocation. In another embodiment, the controller 402 may change the rotation direction of the one or more electric motors 408 in response to receiving the signal indicating the dislocation, such that the robot 100 may move away from the external object 610. For example, the controller 402 may change the rotation direction of both of the electric motors 408 mechanically coupled to the main wheels 106 shown in FIG. 6B such that the robot 100 moves away from the external object 610. As another example, the controller 402 may change the rotation direction of one of the electric motors 408 mechanically coupled to the main wheel 106 such that two electric motors 408 may rotate in opposite direction and the robot 100 rotates clockwise or counter clockwise. Then, the controller 402 may control the electric motors 408 to rotate in the same direction such that the robot 100 may move away from the external object 610.

In embodiments, the one or more sensors 110 may detect an amount of force applied against the disc 102. For example, the one or more sensors 110 may be strain gauges connected between the main body 104 and the disc 102 and detect the force applied against the disc 102 by the external object. In some embodiments, the one or more sensors 110 may detect the direction of the force applied against the disc 102. For example, in FIG. 6B, the one or more sensors 110 may determine that the direction of the force applied against the disc 102 is a direction rotated by about 45 degrees from the +y direction.

The embodiments described herein are directed to robots and robot systems providing bump detection. The robot includes a main body, one or more wheels coupled to the main body, one or more elastic members connected to the main body, a disc connected to the one or more elastic members, and one or more sensors. The disc is configured to move relative to the main body in response to a force exerted against the disc. The one or more sensors may detect the dislocation of the disc relative to the main body in response to the force exerted against the disc. The present robot includes a spring-loaded disc that surrounds the robot. The spring-loaded disc protects the robot from bumping into external objects proximate to the robot. Particularly, when the robot bumps into an object, the spring-loaded disc deflects relative to the main body of the robot and dampens the contact between the robot and the object. Additionally, the sensors of the robot may provide information about the contact between the disc and the object without having to install sensors on the entire surface of the robot with which an external object may contact.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot comprising:
a main body;
one or more wheels coupled to the main body;
one or more elastic members coupled to the main body
a disc coupled to the one or more elastic members and configured to move relative to the main body in response to a force exerted against the disc; and
one or more sensors for detecting a dislocation of the disc relative to the main body in response to the force exerted against the disc.

2. The robot of claim 1, wherein the disc includes one or more openings configured to receive the one or more wheels.

3. The robot of claim 1, further comprising an assistant wheel, wherein the disc includes an additional opening configured to receive the assistant wheel.

4. The robot of claim 1, wherein the one or more elastic members are springs.

5. The robot of claim 1, wherein the one or more sensors include one or more potentiometers configured to generate a signal in response to the dislocation of the disc.

6. The robot of claim 1, wherein the one or more sensors include two potentiometers separated by an offset.

7. The robot of claim 1, wherein the one or more sensors include one or more strain gauges configured to generate a signal in response to the dislocation of the disc.

8. The robot of claim 1, wherein the main body includes one or more posts mechanically coupled to the disc, and
the one or more elastic members are connected between the one or more posts and the disc.

9. The robot of claim 8, wherein:
each of the one or more posts is disposed within one or more holes of the disc,
each of the one or more posts includes an upper stopper and a lower stopper,
the upper stopper is placed over a top surface of the disc, and
the lower stopper is placed under a bottom surface of the disc.

10. The robot of claim 9, wherein:
a diameter of upper stopper is greater than a diameter of each of the one or more holes,
a diameter of lower stopper is greater than a diameter of each of the one or more holes, and a diameter of each of the one or more posts is smaller than a diameter of each of the one or more holes.

11. A robot system comprising:
a main body;
one or more electric motors;
one or more elastic members coupled to the main body;
a disc coupled to the one or more elastic members and configured to move relative to the main body in response to a force exerted against the disc;
one or more sensors for detecting a dislocation of the disc relative to the main body in response to an external force exerted against the disc; and
a controller comprising:
  one or more processors;
  one or more memory modules; and
  machine readable instructions stored in the one or more memory modules that, when executed by the one or more processors, cause the controller to:
    receive a signal indicating the dislocation from the one or more sensors; and
    control an operation of the one or more electric motors based on the signal indicating the dislocation.

12. The robot system of claim 11, wherein the machine readable instructions stored in the one or more memory modules, when executed by the one or more processors, cause the controller to determine a direction of the force exerted against the disc based on the signal indicating the dislocation.

13. The robot system of claim 12, wherein the machine readable instructions stored in the one or more memory modules, when executed by the one or more processors, cause the controller to control a rotation direction of the one or more electric motors based on the direction of the force.

14. The robot system of claim 11, wherein the machine readable instructions stored in the one or more memory modules, when executed by the one or more processors, cause the controller to stop the operation of the one or more electric motors based on the signal indicating the dislocation.

15. The robot system of claim 11, further comprising a network interface hardware configured to transmit the signal indicating the dislocation to a remote computing device via a network.

16. The robot system of claim 11, further comprising one or more wheels mechanically coupled to the one or more electric motors, wherein the disc includes one or more openings configured to receive the one or more wheels.

17. The robot system of claim 11, wherein the one or more elastic members are springs.

18. The robot system of claim 11, wherein the one or more sensors include one or more potentiometers configured to generate a signal in response to the dislocation of the disc.

19. The robot system of claim 11, wherein the one or more sensors include two potentiometers separated by an offset.

20. The robot system of claim 11, wherein the one or more sensors include one or more strain gauges configured to generate a signal in response to the dislocation of the disc.

* * * * *